United States Patent [19]
Olcott et al.

[11] 4,180,211
[45] Dec. 25, 1979

[54] HIGH TEMPERATURE COMPRESSIBLE SUPPORT AND GASKET MATERIAL

[75] Inventors: Eugene L. Olcott, Falls Church, Va.; Edwin F. Abrams, Silver Spring, Md.

[73] Assignee: Versar, Inc., Springfield, Va.

[21] Appl. No.: 474,399

[22] Filed: May 30, 1974

[51] Int. Cl.$^2$ .............................................. B64C 15/06
[52] U.S. Cl. ..................... 239/265.43; 60/200 A; 428/308
[58] Field of Search ....................... 239/265.11, 265.15, 239/265.43; 60/200 A, 205; 428/308; 264/DIG. 6

[56] References Cited
U.S. PATENT DOCUMENTS

| | | | |
|---|---|---|---|
| 3,112,614 | 12/1963 | Ellenburg et al. | 239/265.11 |
| 3,133,411 | 5/1964 | McCorkle | 60/205 |
| 3,142,960 | 8/1964 | Bluck | 138/44 |
| 3,285,519 | 11/1966 | McKague, Jr. | 239/265.15 |
| 3,524,794 | 8/1970 | Jonnes et al. | 428/308 |

*Primary Examiner*—Stephen C. Bentley
*Attorney, Agent, or Firm*—Dowell & Dowell

[57] ABSTRACT

A high-temperature compressible material especially useful in rocket motors to support nozzle ring inserts, the material including a binder which when pyrolyzed leaves a char having substantial strength, and fillers including carbonaceous fillers such as carbon fibers, wools, powders, etc., plus a special filler comprising hollow carbon microspheres which can crush to provide a compressibility to the material when it is confined in a volume-limiting environment, plus other fillers which may be added to obtain special yield characteristics.

6 Claims, 4 Drawing Figures

HIGH TEMPERATURE COMPRESSIBLE SUPPORT AND GASKET MATERIAL

FIELD OF INVENTION

This invention relates to special-purpose high temperature compressible material particularly suitable for backing up and supporting the throat of a rocket nozzle while at the same time yielding to permit the nozzle to expand in use to a controlled extent.

BACKGROUND OF INVENTION

In the past, considerable difficulty has been experienced in connection with the failure of rocket motors using graphite or coated graphite rocket nozzle inserts. The smaller diameter rocket motors where the inside diameter of the insert is of the order of 1" have not been especially troublesome, but larger diameter inserts in the 7" to 12" or higher diameter range have experienced frequent failure in fracture, and it is believed that the reasons for this type of failure can be traced to a lack of understanding of the complex problems resulting from expansion of the inserts during firing of the rocket motor attributable both to temperature and pressure causes. The stresses induced in the nozzle insert include thermal stresses, pressure stresses, and stresses caused by restraint imposed by the press of the backside surface against the insert as the insert expands during heating. The thermal stresses which are induced are caused by the thermal gradient through the thickness of the insert and are compressive on the hot inside surface of the insert, but are tensile on the outer surface of the insert. Whether the insert is graphite, or graphite coated with pyrolytic graphite, the thermal stress in a typical motor insert (based on elastic properties) can exceed the allowable strength of the graphite under the severe thermal conditions resulting during firing of the motor. These thermal stresses may not by themselves exceed the allowable stress, but they at least approach it. Such thermal stresses are additive to the pressure stresses which are also induced in the insert during the firing of the rocket motor as a result of increase in pressure on the inside surface which produces additional tensile stresses on the outer surface of the insert. Such tensile stresses, attributable both to thermal and pressure conditions, can easily exceed the total stresses which the graphite can withstand.

It is recognized that for graphite inserts acceptable stress levels may possibly be achieved by backing up the annular graphite ring with a supporting member. If this supporting member has sufficient compressive strength, then the tensile stress on the outer periphery of the nozzle insert can be reduced by the support of the back-up member, but it is also true that where a stiff back-up member is used to support the nozzle insert, it may not permit the insert to grow sufficiently, and this may cause other destructive stresses within the nozzle insert. In other words, if the back-up material does not compress, then the restraint on the nozzle insert preventing it from expanding will add to the compressive stresses on the inside of the rocket nozzle insert which can also fail, for instance by "chunking".

The difficulties involved in providing an optimum back-up material, even after the problems have been recognized, are increased by the fact that the material which is provided is itself fully confined against escape in any direction, and therefore, it must have a compressive capability of its own. Moreover, there is the additional problem attributable to the very high temperature under which the back-up material is required to perform, such temperatures normally reaching and exceeding 3,000° F.

PRIOR ART

In the past, very little attention has been paid to the matter of supporting the graphite nozzle insert in such a way as to avoid fracture thereof by excessive stresses. The usual practice has been to simply cement the insert in place using an epoxy glue. The applicants made some effort to control the stresses in the insert, for instance, using a wound layer of teflon tape, retained in place by epoxy resin and supporting the nozzle insert, on the theory that the teflon would soften early as the temperature of the insert rose, and that the epoxy would soften later at higher temperature so as to permit some expansion. Another effort was made to use Grafoil tape wound around the nozzle insert, but neither of these approaches proved successful in all respects. Since the graphite nozzle insert is subject to fracturing and disintegration, the prior art approach has been to use other carbon composite structures for this purpose, but such structures erode too fast and are therefore not as successful as a graphite or coated graphite nozzle would be if the stress and fracture problem could be solved.

THE INVENTION

This invention provides a novel back-up material for use in gasket-type applications requiring compressibility and resistance to high temperatures, for instance, up to 6,000° F. This gasket material employs a high carbon char binder comprising, for instance, a phenolic, or a polyimide, or a furane, which contains a controlled amount of carbon microspheres which may also be augmented by an additional filler in the form of fibers, mattes, powder, etc. as will be discussed below. Additional quantities of carbon in one form or another serve as non-ablatives. The binder is of course not initially pyrolyzed, but pyrolyzes above 1,000° F. A binder of the above type is used in perference to an epoxy binder because of the fact that it maintains satisfactory strength even after being pyrolyzed, whereas the use of epoxy as a binder would provide substantially no cohesive strength in the form of a resulting carbon char. By varying the relative amounts of binder, carbon microspheres and/or other fillers and non-ablatives, a desired compressive stress-strain curve can be achieved for the back-up material.

It is a principal object of this invention to provide a high temperature compressible support material for backing up a nozzle insert, where the materials used in the back-up gasket include a quantity of carbon microspheres which are crushable at finite loads, and wherein the crushing strength of the microspheres is relatively insensitive to temperature.

It is another important object of the invention to provide a crushable back-up structure which can itself be fully restrained in all directions while retaining its ability to be compressed. The carbon microsphere appears unique in this application in view of the fact that, being hollow, it can crush inwardly in compression even though the gasket is fully restrained in all directions in such a way that the material is volume-limited with no possibility of any material escaping in any direction. In addition, carbon microspheres have a second very important characteristic, namely that being carbon, they do not change composition with temperature, and their physical behaviour does not tend to change with temperature. If, for example, glass microspheres were substituted for the carbon microspheres, such glass spheres being shown, for example, in an acoustic transmission material in U.S. Pat. No. 3,788,937, the glass would melt at a high temperature and leave a liquid in the back-up material which might produce undesirable effects. In other words, the glass microspheres would not merely crush at a rate which would provide adequate support while at the same time permitting the material to retreat somewhat as the nozzle insert expands. In order to understand the nature of the application to which this material is to be put, it must be understood that the back-up material for a rocket nozzle performs for an interval of time of about one minute. There is no repeat cycling of its performance, and it is preferable that no chemical reaction occur during the dramatic rise in temperature which it experiences. The material must be lightweight in order to satisfy practical requirements, and its compressibility should not be seriously altered by the rise in temperature.

Another object of the invention is to provide a back-up material capable of being cast, or tamped, or otherwise formed to fit into an annular cavity of appropriate dimension to support a rocket nozzle insert. In a typical application, the cavity, and therefore, the gasket dimensions might be 0.060 to 0.125 inches in thickness and up to four inches in depth. Aside from having a satisfactory compressive stress-strain characteristic, it is important that the material be suppliable at reasonable cost, and that it be impermeable to rocket gas. Another requirement which is met by the carbon spheres is that they are readily wetted by liquid resins in the binders as listed above which are of a type leaving a useful bond between the microsphere and the carbon char even after pyrolysis.

Still a further object of the invention is to provide a back-up gasket material including not only carbon microspheres in a suitable binder, but also including other filler materials providing additional degrees of dimensional stability as well as other advantages, and wherein the additional filler materials may comprise fibers, powders, or mattes, as will be discussed in greater detail below.

Other objects and advantages of the present invention will become apparent during the following discussion of the drawings wherein:

THE DRAWINGS

FIG. 1 is an enlarged cross-sectional view through a typical compressive gasket made according to this invention and showing several different types of fillers held together in a binder;

FIG. 2 is a cross-sectional view through a rocket in the vicinity of its propulsion nozzle and showing the nozzle insert backed up by a compressible gasket according to the present invention;

FIG. 3 is a schematic showing of the locations and orientations of various stresses as viewed in a cross-section taken through a rocket nozzle insert; and FIG. 4 is a graphical showing of a desirable stress-strain curve for a compressible support material for use as a rocket nozzle insert back-up member.

DESCRIPTION OF THE DRAWINGS

The showing of FIG. 1 provides a compressible gasket using a number of different fillers respectively to achieve different purposes. The gasket material includes, for example, a cloth of high temperature fibers; for instance, a woven cloth of carbon fibers including weft fibers 10 and warp fibers 12 which have considerable length and which have a tendency to hold the gasket together after it has been pyrolyzed so that some of the binder is gone and the remaining binder is weakened. This fabric would tend to retain the shape of the gasket and give it a certain degree of dimensional stability while it performs its back-up function. The gasket may further include a dispersion of shorter carbon fibers 14 which add further stability to the gasket as a mechanical structure, but really do not increase the volume of the gasket materially. In addition, a high proportion of the filler is selectively proportioned between powder type fillers, such as carbon powders 16 or silica powders 18, and hollow carbon microspheres 20 which make up the remainder of the volume. It should be understood of course that the use of a woven carbon cloth is merely illustrative, and that such a cloth can be replaced by a wool or matte consisting of carbon fibers, there being no necessity that they be in woven cloth form.

Moreover, the hollow microspheres may also include a percentage of glass microspheres of the type discussed in the patent to Lee U.S. Pat. No. 3,788,937. The filler may also include metal fibers or powders, and may further include other non-ablatives comprising not only low-density fibrous carbon, but also Grafoil or low density CVD carbon felt.

The carbon mattes, fibers, wool, or cloth are used to increase the modulus or strength of the gasket even though the binder may become degraded by pyrolysis, and these fillers together with the carbon powder provide a component within the gasket material which is itself essentially incompressible during performance of the gasket, while at the same time these fillers provide most of the body of the gasket percentage-wise.

On the other hand, the carbon microspheres are not incompressible because, being hollow, they crush even though they are under three dimensional volumetric restraint while the gasket is performing its nozzle back-up function. These microspheres are a standard product of Versar, Incorporated, General Technologies Division, located at Springfield, Virginia. The microspheres are within the range of 5–150 microns in diameter and average about 40 microns. They are hollow and have an approximate wall thickness ranging the vicinity of 1 or 2 microns, and their compressive strength is approximately 14,000 p.s.i.. They are useful for a variety of purposes other than making compressible gaskets, some of which purposes include use in high temperature insulation, for providing electrical resistance, in syntactic foam as a filler, in nuclear applications and in molded products, ect. One of their principal advantages is their ability to bond with resins, and their stability at high temperatures attributable to the fact that they are of carbonaceous nature.

Thus far, the discussion has tended in the direction of carbonaceous gasket material fillers whose character does not change with temperature. However, there is also advantage to be had in certain applications by including other materials as additives to these fillers, which other materials do change their characteristics at elevated temperatures. Such additional fillers include glass, silica, or metal additives which have a tendency to melt as the temperature increases. Recalling that it is the purpose of the present invention to provide a gasket material which yields as the pressure increases, the utility of such addition can be further understood considering the following discussion with reference to FIGS. 2, 3, and 4.

Figure 1:
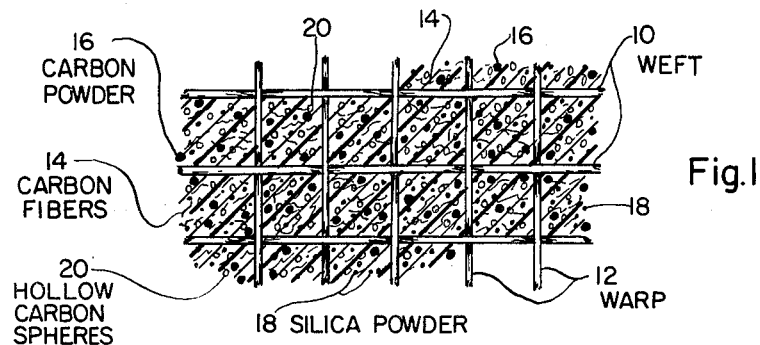
Figure 2:
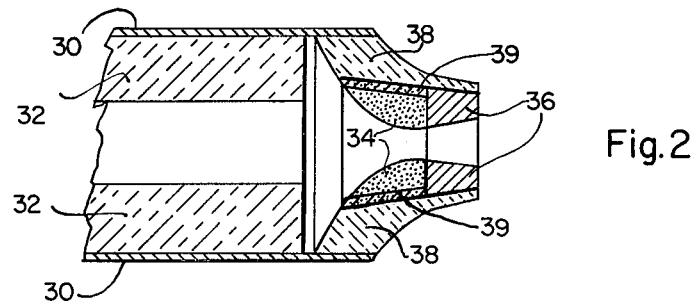

FIG. 2 shows a rocket in a housing 30 including a propellent fuel 32 and a nozzle insert ring 34 which is held in place in an insulating housing 38 by a retainer 36. A gasket 39 according to the present invention surrounds the nozzle insert 34 and provides it with the necessary mechanical support and back-up.

Figure 3:
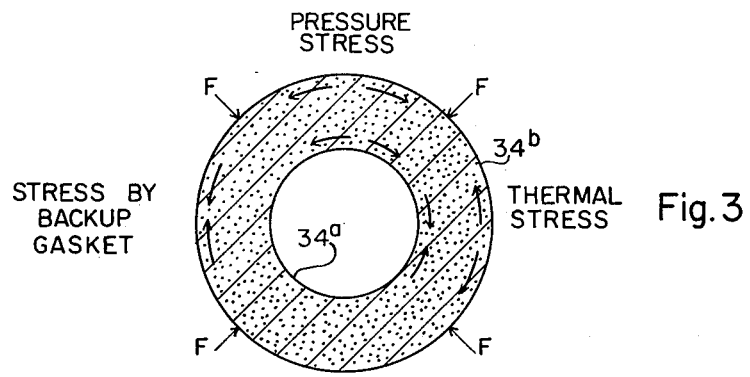

Referring to FIG. 3, this figure provides a schematic showing of the cross-section of a nozzle ring 34 which illustrates that the pressure stress both near the outer periphery 34b and the inner periphery 34a of the ring is tensile, but that the thermal stress is tensile in only the outer periphery 34b of the nozzle insert 34 and is compressive in the inner periphery 34a thereof. The purpose of the gasket is to back-up the nozzle insert in the vicinity of its outer surface by applying forces F which are themselves radially inwardly directed and therefore are compressive in nature so that they at least partially counteract the external tensile stresses occurring both as a result of pressure and temperature.

Figure 4:
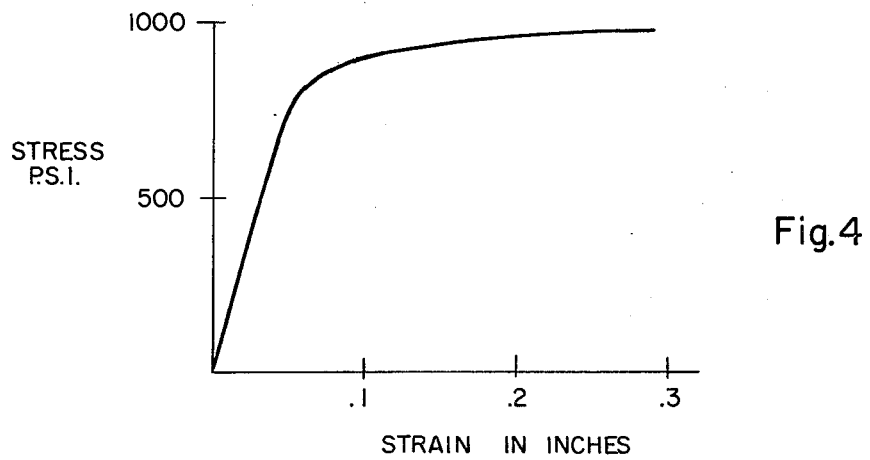

FIG. 4 shows a desired curve of compressive stress, versus strain for the compressible back-up gasket material, and it will be observed that the useful portion of the curve increases approximately linearly nearly to the top of the curve. However, a gasket including only carbon microspheres would tend to flatten out too soon, having done its yielding before the temperature stresses become maximized. In other words, with reference to FIG. 3 it should be noted that in point of time the pressure stresses occur almost immediately as soon as the rocket motor is fired, but that it takes a while for the thermal rise to penetrate through the insert material from the inner periphery 34a thereof to the outer periphery 34b. However, these thermal effects are ultimately greater than the pressure effects. In other words the component of strain attributable to the final temperature reached in the insert is greater than the component of strain occuring because of internal pressure. The inclusion of the glass, or silica or soft metal additives provides a further yield capability in the gasket which comes into effect only after a considerable temperature rise has occurred. Therefore, the carbon spheres tend to accommodate the first compressive strains almost immediately, but as time goes on and the temperature rises, further yield can be provided by a meltable filler, i.e. such as a soft metal like pure aluminium included in the filler, the aluminium melting at 1100° F. This melted metal can fill in some of the pores in the charred binder, and can also fill in voids left by crushing of the hollow microspheres, or perhaps even escape through joints of the mating rocket motor parts. Likewise, the addition of glass and/or silica also provides additional yield but at a still higher temperature of about 2500° F. If glass microspheres are used, their collapse provides space in which the liquid glass and silica can escape as the compression of the gasket continues. Another possible additive would be a salt which is capable of sublimation and would therefore serve to permit collapse of the gasket material without formation of a liquid phase.

In all of these temperature-sensitive additives, it should be noted that these materials all provide very strong support at low temperatures and then soften to permit collapse of the gasket at the higher temperatures and in the final few seconds of operation of the rocket motor. Ordinarily, such a motor operates for approximately one minute or less, and therefore the utility of the gasket is limited to this interval of time, and no recycling of its compression capability is necessary at all. The proportioning of the various fillers, as discussed above, can be selected to obtain a stress versus strain curve of the general type shown in FIG. 4 having substantially any desired shape.

A binder is of course necessary to give the back-up gasket dimensional stability and cohesion prior to its insertion into the rocket, but the binder is also necessary to seal the spaces between the filler materials so that the high pressure of the burning rocket fuel will not blow through the gasket material behind the nozzle insert while the burning process continues. It is therefore necessary that the binder material have a relatively low viscosity prior to cure so that it can be made to thoroughly impregnate the fillers and fill the spaces between them. Moreover, it is necessary that the binder provide a high degree of char formation after pyrolysis and that the resulting char provide a considerable amount of strength after the binder has itself decomposed under the high temperature conditions resulting late in the burning life of the motor. The binder should be in the neighborhood of 15 to 30 percent by weight of the back-up gasket, and at least 50 percent char retention is necessary whereby the loss of binder during pyrolysis can be controlled so that it falls within about 7.5 to 15 percent by weight of the back-up gasket. An initial low viscosity is also desirable in case the back-up gasket material is installed by tamping it into the small cavity which it will occupy behind the nozzle insert.

For this purpose, phenolics, such as Monsanto SC1008, and furanes formed by furfuryl alcohol catalyzed with sulfonic acid generally meet these requirements. A polyimide resin is also satisfactory as the binder.

As stated above, the stresses on the outside of the nozzle insert are a combination of thermal stresses and pressure-induced stresses, which combine to introduce tensile stress which may exceed the allowable limit of a graphite insert since they are additive. As the temperature of the nozzle insert increases, the growth of the outer periphery of the insert depends upon the diameter of the insert to begin with. In small parts, such as in a 1" diameter insert, such radial growth may only reach about 0.002", and can thus be accommodated by machining tolerance in the insulating ring on which the nozzle insert rests. However, for larger diameter graphite inserts, such as for 7" and 12" diameters, the radial growth is typically in the vicinity of 0.015" or 0.020" for average temperatures of 3000° F. Such temperatures are readily reached in 60 seconds or less during firing of such a rocket motor. If the outer periphery of the nozzle can be yieldably supported so that it can expand with just the right amount of restraint contributed by a back-up gasket member, then a satisfactory level of stress can be maintained in the nozzle insert, but if the back-up material does not compress, then the compressive stresses imparted to the annular nozzle insert at its outer surface can exceed the strength of the insert material which will result in fracturing or chunking of the nozzle, especially near its inner periphery. These failures have occurred in the past in rockets having graphite inserts. In a typical 7" nozzle application, the gasket serving to back-up a graphite nozzle insert fits in an annular cavity such that it has a thickness of about 0.060 to 0.125", and this cavity is about 4" long.

This invention is not to be limited to the exact form shown in the drawings, for obviously changes can be made within the scope of the following claims.

We claim:

1. A high-temperature gasket material for filling and sealing a volume-limited space, the gasket material being crushable under high loading without requiring the exit of material from said space, comprising:
   (a) a binder material of a type which pyrolyzes to leave a carbonaceous char which retains substantial strength, the binder material comprising 15 to 30% by weight of the gasket material and the binder material being selected from a group including phenolics, polyimides and furanes;
   (b) crushable filler material in said binder comprising hollow carbon microspheres whose diameters fall within the range of 5 to 150 microns and whose wall thicknesses approximate several microns; and
   (c) other filler materials in said binder and fully occupying the interstices between the microspheres so that substantially the only voids in the uncrushed gasket material are within the microspheres.

2. The material as set forth in claim 1, wherein said other filler materials comprise carbonaceous materials selected from a group including mattes, wools, fibers, cloth, particles and powders.

3. The material as set forth in claim 1, wherein said other filler materials comprise carbonaceous materials blended with other materials which change state within the temperature range required to pyrolyze said binder material, and said other materials being selected from a group including glass spheres, silicas, soft metals and subliming salts.

4. In a rocket assembly including a housing and a nozzle insert therein and a back-up space between the insert and the housing, a high temperature gasket material completely filling and sealing said back-up space and crushable by expansion of said nozzle insert without having material of the gasket leave said space, comprising:
   (a) a binder material of a type which pyrolyzes to leave a carbonaceous char which retains substantial strength, the binder material comprising 15 to 30% by weight of the gasket material;
   (b) crushable filler material in said binder comprising hollow carbon microspheres whose diameters fall within the range of 5 to 150 microns and whose wall thicknesses approximate several microns; and
   (c) other filler materials in said binder and fully occupying the interstices between the microspheres so that substantially the only voids in the uncrushed gasket material are within the microspheres.

5. The material as set forth in claim 4, wherein the binder is selected from a group including phenolics, polyimides, and furanes.

6. The material as set forth in claim 4, wherein said other filler materials comprise carbonaceous materials blended with other materials which change state within the temperature range required to pyrolyze said binder material, and said other materials being selected from a group including glass spheres, silicas, soft metals and subliming salts.

* * * * *